(12) United States Patent
Motas Valls (10) Patent No.: US 8,704,419 B2
(45) Date of Patent: Apr. 22, 2014

(54) MOTOR FOR SELECTIVE INTERACTION OF THE MAGNETIC FIELDS OF PERMANENT MAGNETS

(75) Inventor: Jaume Motas Valls, Girona (ES)

(73) Assignee: Jecsalis Dissenys I Patents, S.L., Sant Feliu de Guisols (Girona) (ES)

( * ) Notice: Subject to any disclaimer, the term of this patent is extended or adjusted under 35 U.S.C. 154(b) by 443 days.

(21) Appl. No.: 13/122,163

(22) PCT Filed: Oct. 1, 2009

(86) PCT No.: PCT/ES2009/000478
§ 371 (c)(1),
(2), (4) Date: Jun. 10, 2011

(87) PCT Pub. No.: WO2010/037880
PCT Pub. Date: Apr. 8, 2010

(65) Prior Publication Data
US 2011/0309703 A1    Dec. 22, 2011

(30) Foreign Application Priority Data

Oct. 1, 2008    (ES) .................................. 200802782

(51) Int. Cl.
*H02K 37/00*    (2006.01)
(52) U.S. Cl.
USPC .......................................... 310/104; 310/103
(58) Field of Classification Search
USPC ..................................... 310/46, 152, 103, 104
See application file for complete search history.

(56) References Cited

U.S. PATENT DOCUMENTS

| | | | | |
|---|---|---|---|---|
| RE29,165 | E | * | 3/1977 | Bode ................................ 310/46 |
| 4,882,509 | A | * | 11/1989 | Wottlin ............................ 310/46 |

FOREIGN PATENT DOCUMENTS

| | | |
|---|---|---|
| CN | A-1078078 | 11/1993 |
| ES | 438365 A1 | 1/1977 |
| ES | 1 015 076 | 5/1991 |
| ES | 2123442 A1 | 1/1999 |
| ES | 1 048 979 | 10/2001 |
| ES | 1051230 U | 7/2002 |
| JP | A-58206884 | 12/1983 |
| JP | 59156170 A | 9/1984 |
| JP | A-60226766 | 11/1985 |
| JP | 61180569 A | 8/1986 |

(Continued)

OTHER PUBLICATIONS

International Search Report for PCT/ES2009/000478 mailed Feb. 2, 2010 (with English Translation).

*Primary Examiner* — Dang Le
(74) *Attorney, Agent, or Firm* — RatnerPrestia (57) ABSTRACT

The motor includes a central rotor rotating about a main shaft, with several first permanent magnets distributed around its periphery, having the same pole on an outer side; a plurality of satellite rotors arranged around the central rotor, each rotating about a corresponding secondary shaft parallel to the main shaft, with various second permanent magnets distributed around its periphery, having the same pole as the first permanent magnets on an outer side; a mechanical drive system to force the central rotor and satellite rotors to rotate in opposite directions, the first and second permanent magnets being arranged facing each other during rotation; and a plurality of magnetic screens, each being arranged between the central rotor and one of the satellite rotors in an upstream portion of the trajectory of the first and second permanent magnets.

20 Claims, 8 Drawing Sheets

(56) References Cited

FOREIGN PATENT DOCUMENTS

| | | |
|---|---|---|
| JP | A-6137261 | 5/1994 |
| JP | 11318070 A | 11/1999 |
| KR | A-100292857 | 3/2001 |
| KR | A-20010026946 | 4/2001 |
| KR | A-20010074126 | 8/2001 |
| KR | A-20030009246 | 1/2003 |

* cited by examiner

MOTOR FOR SELECTIVE INTERACTION OF THE MAGNETIC FIELDS OF PERMANENT MAGNETS

This application is a U.S. National Phase Application of PCT International Application No. PCT/ES2009/000478, filed Oct. 1, 2009.

FIELD OF THE ART

The present invention relates to a motor by selective interaction of magnetic fields of permanent magnets, useful for contributing to energy savings, eventually in cooperation with a conventional-type motor.

BACKGROUND OF THE INVENTION

Document ES-A-1015076 discloses a magnetic motor comprising two rotors assembled in a frame to rotate about respective parallel shafts. Identical and mutually meshing gear wheels are fixed to both shafts forcing the two rotors to rotate at equal speeds in opposite directions. Each rotor has cross-shaped arms at the ends of which permanent magnets are arranged. The magnets assembled in one of the rotors are fixed whereas the magnets assembled in the other rotor can rotate freely about respective shafts perpendicular to the shaft of rotation of the corresponding rotor.

Patent JP-A-60226766 describes a drive power generating device comprising a stator made up of an odd number of fixed permanent magnets arranged in pairs spaced at equal angular intervals around its inner perimeter, the magnets of each pair having opposite poles on their inner side, and a rotor assembled to rotate about an shaft and provided with an even number of permanent magnets spaced at equal angular intervals around its outer perimeter, all the magnets of the rotor having the same pole on the outer side. The device further comprises a magnetic unit capable of canceling the lines of magnetic force arranged between the stator and the rotor and mechanically connected to rotate in cooperation with the rotor. This magnetic unit controls the forces of repulsion and attraction between the permanent magnets of the stator and the rotor.

The patent JP-A-6137261 discloses rotating equipment comprising a number of fixed permanent magnets at equal angular intervals on the inner perimeter of a stator and an equal number of fixed permanent magnets at equal angular intervals on the outer perimeter of a rotor assembled to rotate about a shaft. A magnetic screen body with a portion of screen associated with each permanent magnet of the stator is statically arranged between the permanent magnets of the rotor and of the stator to interrupt lines of magnetic braking force at the time that they are the strongest.

Patent JP-A-58206884 describes a magnetic drive apparatus based on a first static permanent magnet arranged facing a second permanent magnet provided with vertical reciprocating movement and connected to a rotating shaft by means of a connecting rod and crankshaft mechanism. A device driven by an electromagnet arranges a screen plate between the two electromagnets and alternately removes it. When the screen plate is removed, the force of attraction between the two magnets displaces the second magnet upwards, performing half a turn of the shaft by means of the connecting rod and crankshaft mechanism. When the screen plate is arranged therebetween, the lines of force between the two magnets are interrupted and the second magnet moves down due to the effect of gravity, performing another half turn of the rotating shaft, and so on and so forth.

Documents ES-A-1048979, ES-A-1051230, CN-A-1078078, KR-A-100292857, KR-A-20010026946, KR-A-20010074126 and KR-A-20030009246 describe other examples of motor devices based on using the magnetic force exerted by permanent magnets.

In several of the aforementioned documents, the use of magnetic screens to interrupt or mitigate the interaction between the magnetic fields of permanent magnets is referred to. However, they do not mention the constructive features of such magnetic screens. A material in the art which allows building a relatively thin screen capable of interrupting the lines of magnetic force between two magnets or between a magnet and a ferromagnetic material is unknown.

DISCLOSURE OF THE INVENTION

The object of the present invention is to contribute in improving the previous apparatuses by providing a motor based on the selective interaction of magnetic fields of permanent magnets using magnetic screens effective in interrupting the lines of force between the permanent magnets.

The motor of the present invention essentially comprises a first rotor assembled to rotate about a main shaft supported in a frame and at least a second rotor assembled to rotate about a secondary shaft supported in said frame and parallel to said main shaft. A plurality of first permanent magnets are fixed around the periphery of the aforementioned first rotor spaced at equal angular intervals, all the aforementioned first permanent magnets having the same pole on an outer side, i.e., the side farthest from the main shaft. Similarly, a plurality of second permanent magnets are fixed around the periphery of said second rotor spaced at equal angular intervals, all the aforementioned second permanent magnets having the same pole on an outer side, i.e., the side farthest from said secondary shaft. The pole arranged on the aforementioned outer side of the first permanent magnets of the first rotor is equal to the pole arranged on the outer side of the second permanent magnets of the second rotor, such that the first and second permanent magnets repel each other.

The first and second rotors are kinematically linked by mechanical movement transmission means forcing them to rotate in opposite directions and at tangential speeds selected such that the first and second permanent magnets of the first and second rotors are arranged facing each other temporarily and consecutively during rotation without any physical contact between them. A magnetic screen capable of canceling or mitigating the lines of magnetic force between the first permanent magnets of the first rotor and the second permanent magnets of the second rotor is arranged partially between the first and second rotors. The magnetic screen is arranged in an upstream portion of the trajectories of the first and second permanent magnets, such that the force of repulsion created in a downstream portion of the trajectories of the first and second permanent magnets by the lines of force between them not interrupted or mitigated by the magnetic screen force the rotation of the first and second rotors in opposite directions. The aforementioned mechanical movement transmission means transmit the rotation of the secondary shaft of the second rotor to the main shaft of the first rotor and vice versa, and the rotation of the main shaft can be used to drive an apparatus, such as a machine or a vehicle.

The magnetic screen is formed by two superimposed plates made of permanent magnet with equal poles on their contacting faces and equal poles on their outer faces. In an operating situation, the poles located on the outer faces of the two plates of the magnetic screen are equal to the poles located on the outer sides of the first and second permanent magnets of the first and second rotors with the result of substantially interrupting the magnetic interaction between the first and second permanent magnets in the upstream portion of their trajectories. Throughout this description, the upstream and downstream portions of the trajectories of the first and second permanent magnets are understood to be demarcated by an imaginary plane joining or containing the main shaft and the secondary shaft. Thus, for example, the magnetic screen is located upstream of said imaginary plane in relation to the directions of the trajectories of the first and second permanent magnets, and it preferably has a leading edge located in said imaginary plane or close to it. In one embodiment, the circumferential dimension of the first permanent magnets is greater than the circumferential dimension of the second permanent magnets, and they are arranged according to the diameters and the tangential speeds of the respective first and second rotors such that a leading edge of each first permanent magnet traverses the aforementioned imaginary plane before a leading edge of a corresponding second permanent magnet, whereas trailing edges of the first and second permanent magnets traverse the imaginary plane substantially at the same time.

In one embodiment, the two permanent magnet plates forming the magnetic screen are substantially the same size, such that when they are superimposed their respective edges are contiguous, and the magnetic screen includes a granulated permanent magnet bead arranged along said contiguous edges of the two plates. This granulated bead tends to neutralize the lines of magnetic force in the contiguous edges of the plates. The aforementioned granulated permanent magnet can be obtained, for example, by grinding permanent magnets until obtaining granules and passing the granules obtained through one or more sieves to obtain a substantially uniform particle size or one that does not exceed a maximum predetermined size. The aforementioned maximum size will depend on the size of the magnetic screen, and, only by way of example, a maximum particle size of 0.5 to 1.5 mm can be indicated for a general application magnetic screen.

The two permanent magnet plates of the magnetic screen mutually repel each other due to them having equal poles on their contacting faces, and they are held together against the magnetic force of repulsion by a band, which preferably also envelops said granulated permanent magnet bead. A practical manner of obtaining and placing such band is to use a plastic sleeve susceptible of shrink-wrapping by means of applying heat. Optionally, the magnetic screen can further include a layer of granulated permanent magnet on the outer face of the permanent magnet plate arranged facing the first rotor or a layer of granulated permanent magnet on the outer face of each of the two plates, the layer or layers of granulated permanent magnet also being enveloped by said band together with the plates and the granulated permanent magnet bead.

Preferably, each of the first permanent magnets of the first rotor has on the outer side an exposed surface ideally in the form of a cylindrical part surface with all its points equidistant from the main shaft and each of the second permanent magnets of the second rotor has on the outer side an exposed surface ideally in the form of a cylindrical part surface with all its points equidistant from the secondary shaft. The first and second permanent magnets also preferably have on the inner side concealed surfaces in the form of a cylindrical part surface substantially parallel to their respective exposed surfaces, and leading and trailing edges (according to the directions of their trajectories) ideally in the form of planes the imaginary prolongations of which meet in the respective main and secondary shafts of the first and second rotors.

In one embodiment, for the purpose of regulating the power generated by the motor of the present invention, the secondary shaft is movably supported with respect to the frame and connected to a first control mechanism, which can be operated manually or by mechanical means to gradually vary the distance between the secondary shaft and the main shaft. This achieves gradually varying the distance between the outer sides or exposed surfaces of the second permanent magnets of the second rotor and the outer sides or exposed surfaces of the first permanent magnets of the first rotor, when they are arranged facing each other, between a position of maximum distance corresponding to the minimum power and a position of minimum distance corresponding to the maximum power, including any intermediate position. Optionally, the magnetic screen is also movably assembled and connected to a second operable control mechanism to move said magnetic screen between a position of minimum interference and a position of maximum interference between the first and second permanent magnets of the first and second rotors, including any intermediate position. Preferably, the aforementioned first and second control mechanisms, should they co-exist, are arranged such that they can be operated simultaneously and/or jointly to match up said position of minimum distance with said position of minimum interference and said position of maximum distance with said position of maximum interference. The term "position of minimum interference" indicates that position of the magnetic screen arranged partially between the first and second rotors in the upstream portion of the trajectories of the first and second permanent magnets suitable for the operation of the motor at maximum power.

The diameters of the first and second rotors can be substantially equal, in which case they will have the same number of respective first and second permanent magnets, or they can be different, in which case the rotor having a greater diameter will have a greater number of permanent magnets. According to a preferred embodiment, the first rotor has a greater diameter and a plurality of second rotors is arranged at equal angular intervals around the first rotor, such that the first rotor acts like a central rotor and the second rotors act like satellite rotors. The aforementioned satellite rotors are assembled to rotate about respective secondary shafts parallel to the main shaft and equidistant therefrom. Mechanical movement transmission means are arranged kinematically linking the central rotor and the satellite rotors to force them to rotate in opposite directions and at tangential speeds selected such that the second permanent magnets of the satellite rotors are arranged facing the first permanent magnets of the central rotor temporarily and consecutively during rotation. A corresponding magnetic screen is arranged between each of the satellite rotors and the central rotor, the characteristics and the arrangement of said magnetic screen being according to that described above. The number of satellite rotors arranged around the central rotor is preferably an odd number to prevent lines of force from passing through the center or main shaft of the central rotor. More preferably, the number of first permanent magnets arranged in the central rotor is an odd number and the number of satellite rotors is equal to the number of first permanent magnets in the central rotor.

To allow regulating the power of the motor, the secondary shafts are preferably movably supported with respect to the frame and connected to a first control mechanism, which can be operated manually or by mechanical means to gradually vary the distance between the secondary shafts and the main shaft in unison between a position of minimum distance and a position of maximum distance, including any intermediate position. In one embodiment, the magnetic screens are fixed to frame in selected static positions. However, in an alternative embodiment all the magnetic screens are connected to a second control mechanism which can be operated to move the magnetic screens in unison between a position of minimum interference and a position of maximum interference, including any intermediate position, as has been described above for a single second rotor. In this case, it can be advantageous for both first and second control mechanisms to be arranged such that they can be operated simultaneously and/or jointly to move the satellite rotors and the magnetic screens at the same time, matching the position of minimum distance of the rotors with the position of minimum interference of the magnetic screens and the position of maximum distance of the rotors with the position of maximum interference of the magnetic screens. The motor can thereby be regulated between a stop or minimum power state and a maximum power state, including any intermediate state.

Generally, to facilitate a practical application of the motor of the present invention, the main shaft of the central rotor is configured such that it can be connected by means of an output mechanical movement transmission to an apparatus to be driven, such as a machine or a vehicle. The main shaft of the central rotor can also be connected additionally by means of an input mechanical movement transmission to an auxiliary motor, such as a conventional electric motor, such that the latter can supply power to the central rotor during a startup period and/or in load periods in which the load exceeds a pre-established threshold.

BRIEF DESCRIPTION OF THE DRAWINGS

The foregoing and other features and advantages will be better understood from the following detailed description of an exemplary embodiment with reference to the attached drawings, in which.

DETAILED DESCRIPTION OF AN EXEMPLARY EMBODIMENT

Figure 1:
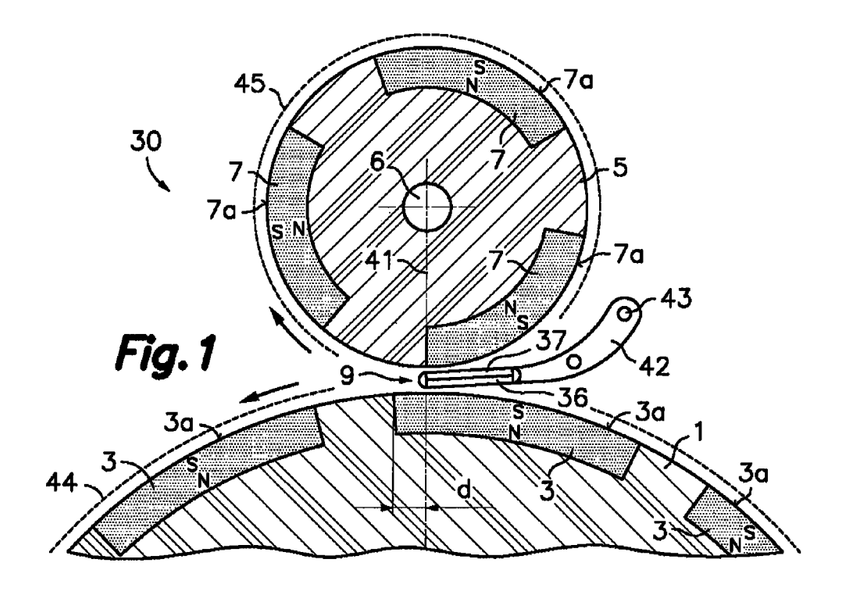
FIG. 1 is a front elevational schematic depiction of a motor by selective interaction of magnetic fields of permanent magnets according to a basic embodiment of the present invention with the rotors in a first singular angular position.
Figure 2:
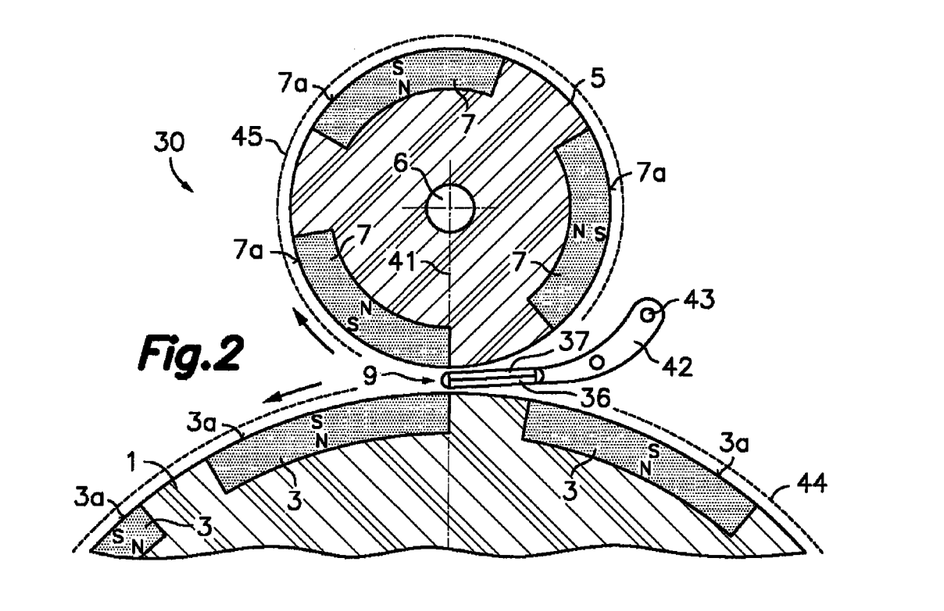
FIG. 2 is a front elevational schematic depiction of the motor of FIG. 1 in a singular second angular position.

First making reference to FIGS. 1 and 2, reference numeral 30 generally designates a motor by selective interaction of magnetic fields of permanent magnets according to a basic embodiment of the present invention, which comprises a first rotor 1 arranged to rotate about a main shaft 2 (not shown in FIGS. 1 and 2) supported in a frame (not shown) and a second rotor 5 assembled to rotate about a secondary shaft 6 supported in said frame and parallel to the main shaft 2. Said first rotor 1 has a plurality of fixed first permanent magnets 3 which are spaced and distributed at equal angular intervals around its periphery. All the aforementioned first permanent magnets 3 have the same pole, for example pole S, on an outer side farthest from said main shaft 2. The aforementioned second rotor 5 has a plurality of fixed second permanent magnets 7 which are spaced and distributed at equal angular intervals around its periphery. All the aforementioned second permanent magnets 7 have the same pole, for example pole S, on an outer side farthest from said secondary shaft 6. The pole arranged on the outer side of the second permanent magnets 7 of the second rotor 5 has to be equal to the pole arranged on the outer side of the first permanent magnets 3 of the first rotor 1. Each of the first permanent magnets 3 of the first rotor 1 has on the outer side an exposed surface 3a in the form of a cylindrical part surface with all its points equidistant from the main shaft 2 and each of the second permanent magnets 7 of the second rotor 5 has on the outer side an exposed surface 7a in the form of a cylindrical part surface with all its points equidistant from the secondary shaft 6. The first and second permanent magnets 3, 7 have an inner side and leading and trailing edges embedded in the material of the respective first and second rotors 1, 5, which are made of a non-magnetic material, such as a plastic.

Mechanical movement transmission means are arranged kinematically linking the first and second rotors 1, 5 to force them to rotate in opposite directions and at tangential speeds selected such that the first and second permanent magnets 3, 7 of the first and second rotors 1, 5 are arranged facing each other temporarily and consecutively during rotation. By way of example, in the basic embodiment shown in FIGS. 1 and 2, the aforementioned mechanical movement transmission means are symbolically depicted by respective integral, mutually meshing first and second gear wheels 44, 45 of the first and second rotors 1, 5, respectively, such that the tangential speeds of the first and second rotors 1, 5 are equal, although other drive means for providing equal or different tangential speeds are possible. The size and arrangement of the first and second permanent magnets 3, 7 must be according to the relative tangential speeds of the first and second rotors 1, 5. A magnetic screen 9, which is capable of interrupting or mitigating the interaction of the magnetic fields of the first and second permanent magnets 3, 7 therethrough, is arranged partially between the first and second rotors 1, 5.

The aforementioned magnetic screen 9 is joined to a support member 42 fixed to the frame by means of fixing elements 43, such as screws or the like. The support member 42 keeps the magnetic screen 9 located upstream of an imaginary plane 41 containing the geometric axis of the main shaft 2 of the first rotor and the geometric axis of the secondary shaft 6 of the second rotor 5 in relation to the directions of the trajectories of the first and second permanent magnets 3, 7. The magnetic screen 9 preferably has a leading edge located in said imaginary plane 41 or close to it. The circumferential dimension of the first permanent magnets 3 is greater than the circumferential dimension of the second permanent magnets 7 by a distance d (FIG. 1). The first and second permanent magnets 3, 7 are arranged according to the diameters and tangential speeds of the first and second rotors 1, 5 such that the leading edge of each first permanent magnet 3 traverses the imaginary plane 41 before the leading edge of a corresponding second permanent magnet 7, as shown in FIG. 1, whereas the trailing edges of the first and second permanent magnets 3, 7 traverse the imaginary plane substantially at the same time, as shown in FIG. 2.

In the upstream portion of the trajectory of the first and second permanent magnets 3, 7 the interaction of the magnetic fields of the first and second permanent magnets 3, 7 of the first and second rotors 1, 5 is cancelled or mitigated by the action of the magnetic screen 9. In contrast, in the downstream portion of the trajectory of the first and second permanent magnets 3, 7 where the magnetic screen 9 is not encountered, the interaction of the magnetic fields of the same sign creates magnetic forces of repulsion between the first and second permanent magnets 3, 7 forcing the rotation of the first and second rotors 1, 5 in the respective opposite directions indicated by means of arrows in FIGS. 1 and 2. The motor 30 according to the basic embodiment illustrated in FIGS. 1 and 2 does not include any control mechanism to regulate the power.

Figure 3:
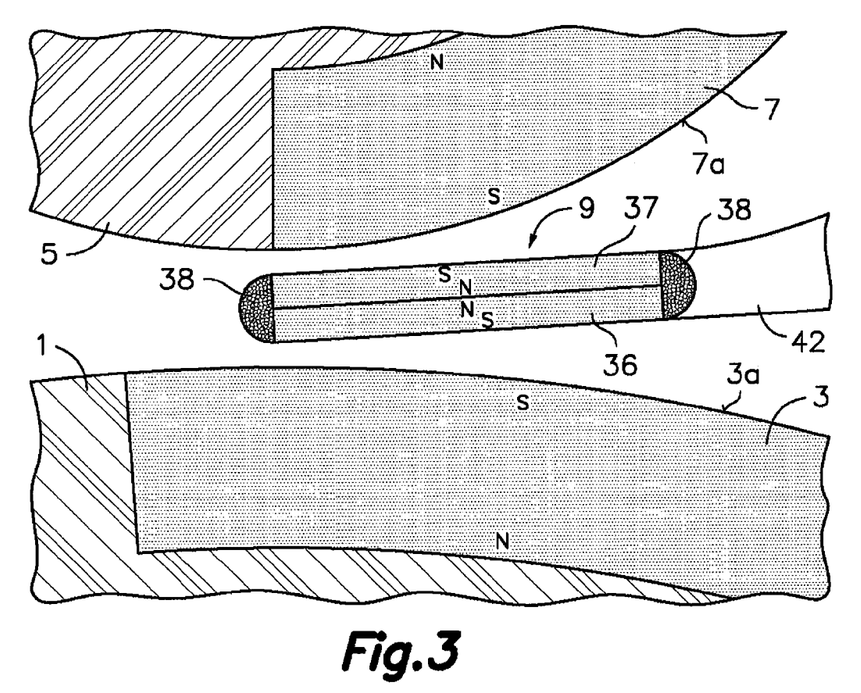
FIG. 3 is a schematic view of an enlarged detail showing the arrangement of a magnetic screen in the motor of FIGS. 1 and 2.
Figure 4:
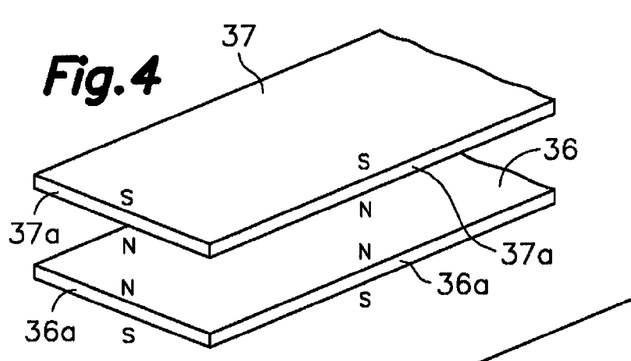
FIG. 4 is a perspective view of permanent magnet plates forming part of the magnetic screen.
Figure 5:
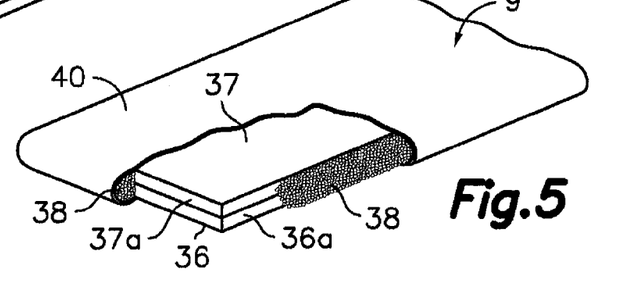
FIG. 5 is a cut-away perspective view of the magnetic screen according to one embodiment.

The construction of the magnetic screen 9 according to one embodiment is described below in relation to FIGS. 3 to 5. The magnetic screen 9 is formed by two superimposed permanent magnet plates 36, 37 with equal poles on their contacting faces (for example poles N) and equal poles on their outer faces (for example poles S). The poles arranged on the outer faces of said permanent magnet plates 36, 37 of the magnetic screen 9 must be equal to the poles arranged on the outer sides of the first and second permanent magnets 3, 7 of the first and second rotors 1, 5 for the purpose of interrupting or mitigating the magnetic interaction between the first and second permanent magnets 3, 7 in the upstream portion of their trajectories where the magnetic screen 9 is located.

Preferably, the two permanent magnet plates 36, 37 of the magnetic screen 9 are substantially the same size and when they are superimposed, they have respective contiguous edges 36a, 37a. The magnetic screen 9 includes a granulated permanent magnet bead 38 arranged along said contiguous edges 36a, 37a of the two permanent magnet plates 36, 37 for the purpose of contributing to neutralize the lines of magnetic force in the aforementioned contiguous edges 36a, 37a. The equal poles on the mutually contacting faces of the two permanent magnet plates 36, 37 generate a magnetic force of repulsion, so they must be forced by external means to stay joined together. For example, in the illustrated embodiments, the two permanent magnet plates 36, 37 of the magnetic screen 9 are held together against the magnetic force of repulsion by a band 40 which also envelops said granulated permanent magnet bead 38. This band 40 can be, for example, a shrink-wrapped plastic case packing the two permanent magnet plates 36, 37 and the granulated permanent magnet bead 38, as shown in FIG. 5.

Figure 6:
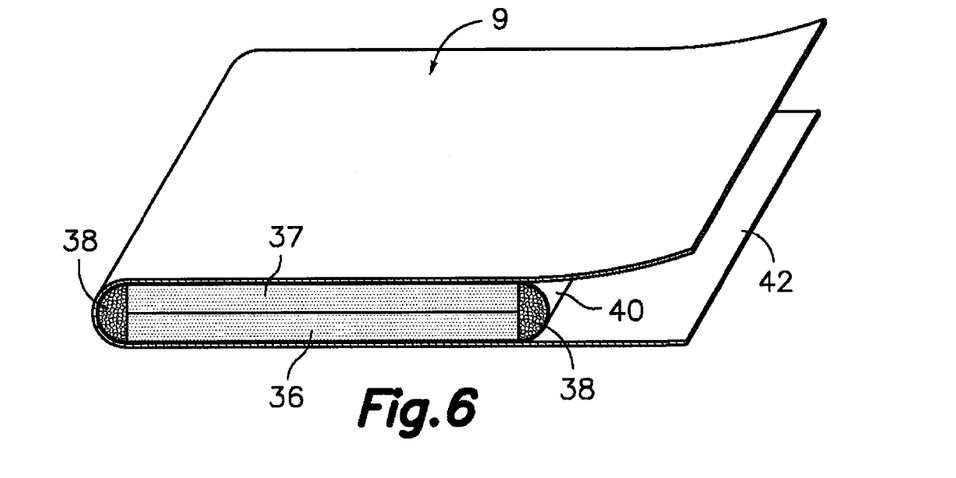
FIG. 6 is a partial sectioned perspective view illustrating the integration of the magnetic screen in a support member.

FIG. 6 shows part of the support member 42, which is in the form of a hollow casing made of sheet of a non-ferromagnetic metal, such as zinc, and the magnetic screen 9 is housed inside the hollow casing formed by the support member 42. Thus, a large part of the magnetic screen 9 is covered by the sheet of the support member 42, and in the covered parts, the sheet of the support member 42 is in contact with the band 40 of the magnetic screen 9.

Figure 7:
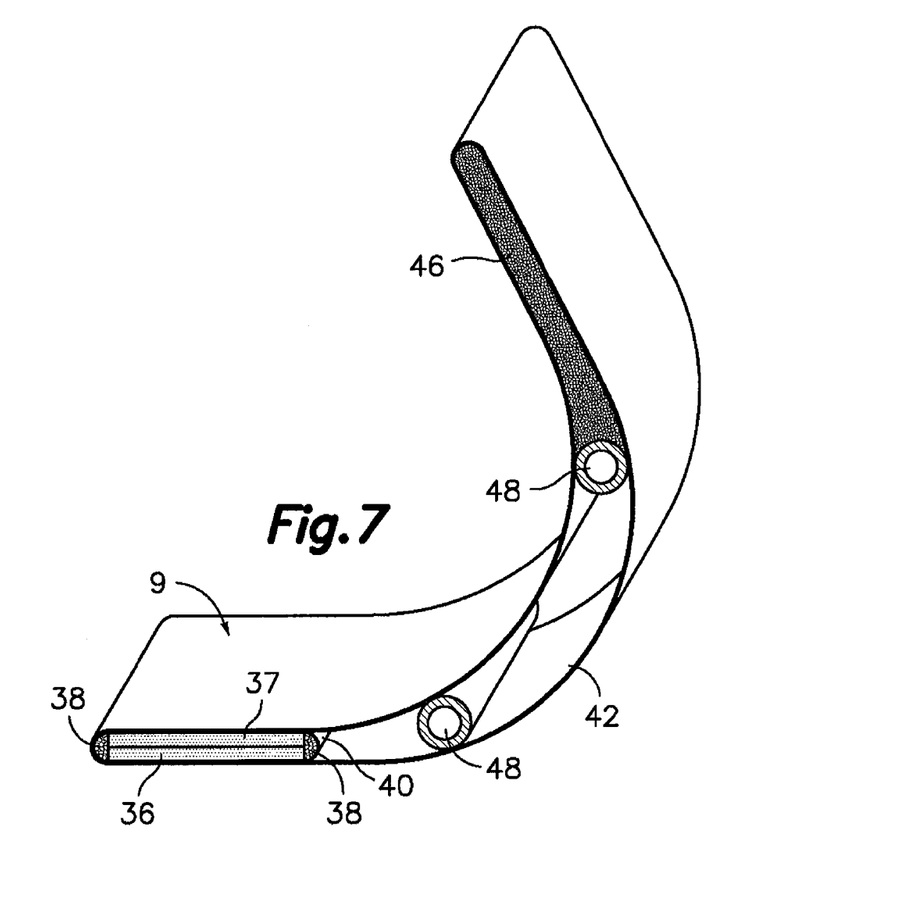
FIG. 7 is a sectioned perspective view of a support member holding the magnetic screen and a magnetic cooperation component.

FIG. 7 shows an alternative configuration where the support member 42 supports, in addition to the magnetic screen 9, at an opposite end, an auxiliary magnetic screen 46 the function of which will be explained below in relation to a complex embodiment of the motor 50 schematically illustrated in FIGS. 9 to 11. In the alternative configuration of FIG. 7, the aforementioned auxiliary magnetic screen 46 is formed simply of granulated permanent magnet arranged in an envelopment demarcating its outer shape. In the illustrated example, the support member 42 is formed by a hollow casing of a sheet of non-ferromagnetic metal and the granulated permanent magnet of the auxiliary magnetic screen 46 is housed at one end of the hollow casing of the duly formed support member 42. A pair of parallel tubes 48 fixed, for example by welding, to the two opposite walls of the sheet of the support member 42 are also arranged inside the hollow casing of the support member 42. These two tubes 48 allow the insertion therethrough of corresponding fixing elements, such as screws, threaded rods, etc., to fix the support member 42, and accordingly the magnetic screen 9 and the auxiliary magnetic screen 46, to the frame in a fixed position. The tube 48 closest to the auxiliary magnetic screen 46 can optionally be used as part of the envelopment enclosing the granulated permanent magnet, as illustrated in FIG. 7.

Figure 8:
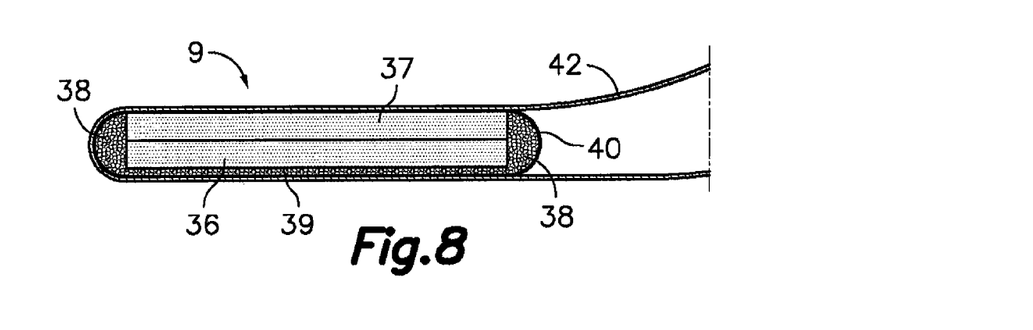
FIG. 8 is a partial cross-section view of a magnetic screen according to another exemplary embodiment integrated in a support member.

FIG. 8 shows an embodiment variant where the magnetic screen 9 further includes a layer of granulated permanent magnet 39 on the outer face of the permanent magnet plate 36 arranged facing the first rotor 1. In this case, the band 40 also envelops said layer of granulated permanent magnet 39. Alternatively, the magnetic screen 9 could have a layer of granulated permanent magnet on the outer face of the other permanent magnet plate 37 arranged facing the second rotor 5, or a layer of granulated permanent magnet on the outer face of each of the permanent magnet plates 36, 37.

Figure 9:
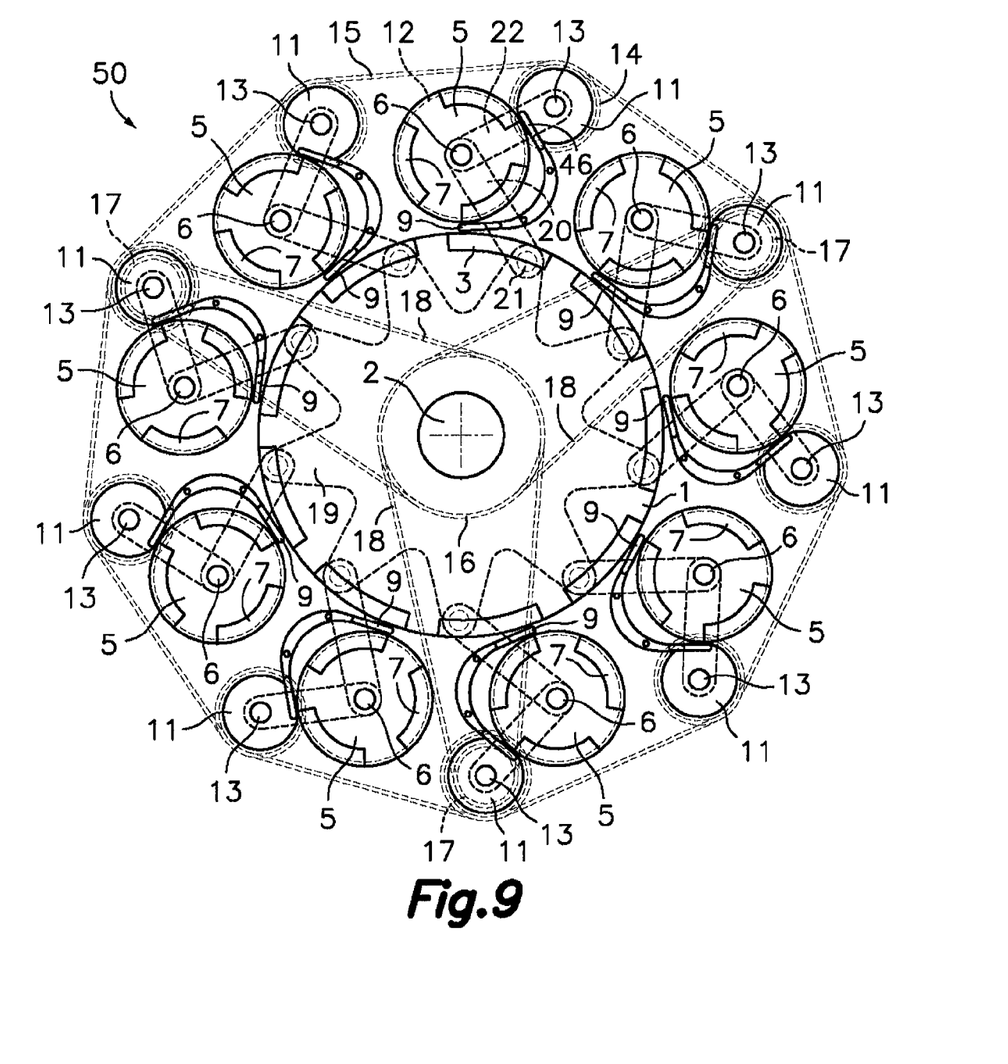
FIG. 9 is a front elevational schematic depiction of a motor by selective interaction of magnetic fields of permanent magnets according to a complex exemplary embodiment of the present invention.
Figure 10:
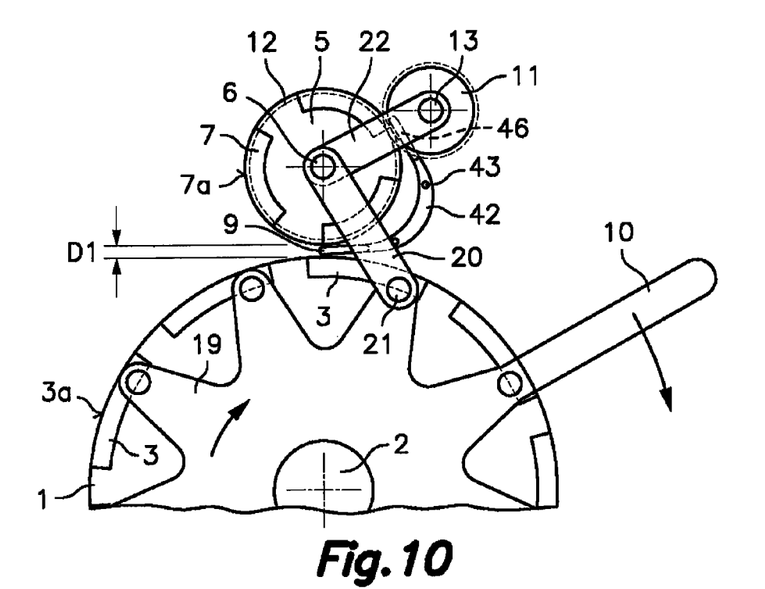
FIGS. 10 and 11 are partial front elevational views illustrating the operation of a first control mechanism in the motor of FIG. 9, where for greater clarity of the drawing some elements of the motor have been completely or partially omitted.
Figure 11:
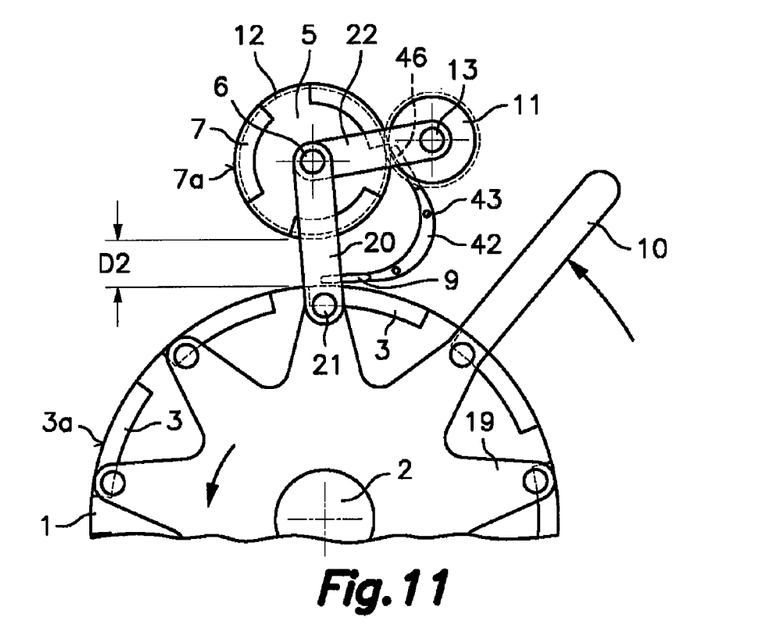

In relation to FIGS. 9 to 11 a motor 50 according to a complex embodiment of the present invention is now described, which comprises a central rotor 1 assembled in a frame (not shown) such that it can rotate about a main shaft 2 and a plurality of satellite rotors 5 arranged at equal angular intervals around said central rotor 1 such that they can rotate about respective secondary shafts 6 parallel to the main shaft 2. The central rotor 1 of FIG. 9 essentially has the same characteristics as the first rotor 1 of FIGS. 1 and 2, and each satellite rotor 5 of FIG. 9 essentially has the same characteristics as the second rotor 5 of FIGS. 1 and 2. The central rotor 1 has a number of first permanent magnets 3 distributed at equal angular distances around its periphery and each satellite rotor 5 has a number of second permanent magnets 7 distributed at equal angular distances around its periphery. A magnetic screen 9 is arranged between the central rotor 1 and each of the satellite rotors 5 to act similarly to the magnetic screen 9 described in relation to FIGS. 1 to 8.

In the motor 50 shown in FIGS. 9 to 11, each of the magnetic screens is joined to one end of a support member 42 which in turn is fixed to the frame by means of fixing elements 43. The support member 42 has at the other end opposite the magnetic screen 9, an auxiliary magnetic screen 46 close to the corresponding satellite rotor 5. The function of this auxiliary magnetic screen 46 is to mitigate any interaction between the magnetic fields of the second permanent magnets 7 of two adjacent satellite rotors 5. The assembly formed by the support member 42, the magnetic screen 9 and the auxiliary magnetic screen 46 could be similar to that described above in relation to FIG. 7. The shape and dimensions of the support members 42, magnetic screens 9 and auxiliary magnetic screens 46 are variable and will be suited to the characteristics of the central rotor 1 and satellite rotors 5.

The central rotor 1 and all the satellite rotors 5 are kinematically linked to each other by mechanical movement transmission means forcing the satellite rotors 5 to rotate in a direction opposite the direction of rotation of the central rotor 1. The relative tangential speeds are selected such that the second permanent magnets 7 of the satellite rotors 5 and the first permanent magnets 3 of the central rotor 1 are arranged facing each other temporarily and consecutively during rotation. In the embodiment shown in FIG. 9, the central rotor 1 has nine first permanent magnets 3, and around the central rotor 1 there are arranged nine satellite rotors 5, each of which in turn has three second permanent magnets 7. It can be seen that the number of first permanent magnets 3 in the central rotor is equal to the number of satellite rotors 5. The mechanical movement transmission means are arranged such that, during rotation, the first permanent magnets 3 of the central rotor 1 are arranged facing the second permanent magnets 7 of the satellite rotors 5 consecutively, individually and simultaneously. It will further be seen that this number of first permanent magnets 3 of the central rotor 1 and of satellite rotors 5 is odd. The odd number of first permanent magnets 3 and of satellite rotors 5 assures that there are no diametrically opposing forces arranged facing each other in the system passing through main shaft 2. The number nine has been selected to provide a suitable distribution of the satellite rotors 5 around the central rotor 1, although any other odd number would also be possible. Nevertheless, the device of the present invention could also operate with an even number of first permanent magnets 3 in the central rotor 1 and of satellite rotors 5, and even with a different number of first permanent magnets 3 in the central rotor 1 and of satellite rotors 5. For example, a number of satellite rotors 5 equal to the number of first permanent magnets 3 in the central rotor 1 plus/minus one could favor the generation of tangential components in the forces of repulsion between the first and second permanent magnets 3, 7. The number of second permanent magnets 7 in each satellite rotor 5 is arbitrary and could be different from three.

In the illustrated embodiment, the aforementioned mechanical movement transmission means comprise for each satellite rotor 5 a first gear wheel 11 assembled in said frame such that it can freely rotate about an auxiliary shaft 13 and a second gear wheel 12 arranged such that it rotates integrally with the satellite rotor 5 about the secondary shaft 6. Each first gear wheel 11 meshes with its corresponding second gear wheel 12, such that the satellite rotors 5 rotate in the direction opposite the direction of rotation of the first gear wheels 11. The mechanical movement transmission means further comprise a plurality of first toothed wheels 14, each of which is arranged such that they rotate integrally with one of said first gear wheels 11 about their corresponding auxiliary shaft 13, and a first endless cog belt or chain 15 arranged around all the first toothed wheels 14 and meshing with a sector of each of them to force all the first gear wheels 11 to rotate in unison in the same direction and accordingly all the satellite rotors 5 to rotate in unison in an opposite direction.

The mechanical movement transmission means further comprise second toothed wheels 16 which rotate integrally with the central rotor 1 about the main shaft 2, third toothed wheels 17 which rotate integrally with some of the first gear wheels 11 about their corresponding auxiliary shafts 13, and second cog belts or chains 18, each meshing with one of said second toothed wheels 16 and one of said third toothed wheels 17. Thus, by means of the first, second and third toothed wheels 14, 16, 17 and the first and second cog belts or chains 15, 18, the central rotor 1 and all the gear wheels 11 rotate in the same direction, and by means of the first and second gear wheels 11, 12, all the satellite rotors 5 rotate in the same direction opposite the direction of rotation of the central rotor 1. The motor 50 of the embodiment shown in FIG. 9 incorporates three pairs of second and third toothed wheels 16, 17 and three corresponding second cog belts or chains 18 spaced at equal angular intervals around the main shaft 2 to provide a balanced distribution of stresses. However, the number thereof is irrelevant, only one being indispensable. In FIG. 9, the first and second gear wheels 11, 12, the first, second and third toothed wheels 14, 16, 17, and the first and second cog belts or chains 15, 18 are schematically depicted by means of dashed lines.

Both the central rotor 1 and the satellite rotors 5 are preferably elongated in the axial direction thereof, for example, in the form of elongated cylinders with a body made of a non-magnetic material, such as nylon or another polymeric material, or of a non-ferromagnetic metal material, such as aluminum or austenitic stainless steel, and each of the first and second permanent magnets 3, 7 has the form of a strip oriented in the axial direction housed in a corresponding channel of the body of the central rotor 1 or satellite rotor 5. The configuration of the first and second permanent magnets 3, 7 is such as that described above in relation to the embodiment of FIGS. 1 and 2. The number of first and second permanent magnets 3, 7 capable of being arranged facing each other at the same time, the distance radial from each of the main and secondary shafts 1, 2 to the exposed surfaces 3a, 7a of the corresponding first and second permanent magnets 3, 7, the length in the axial direction of the first and second permanent magnets 3, 7, and the separating distance between the exposed surfaces 3a, 7a of the first and second permanent magnets 3, 7 when they are arranged facing each other determine the power of the motor device.

In the motor 50 of the complex embodiment shown in FIGS. 9 to 11, the secondary shafts 6 of the satellite rotors 5 are movably supported with respect to a frame and connected to a control mechanism which can be operated to vary the distance between the secondary shafts 6 and the main shaft 2, and thereby vary the separating distance between the exposed surfaces 7a of the second permanent magnets 7 of the satellite rotors 5 and the exposed surfaces 3a of the first permanent magnets 3 of the central rotor 1, when they are arranged facing each other, between a position of minimum distance D1 (FIGS. 9 and 10) and a position of maximum distance D2 (FIG. 11), including any intermediate position. Thus, by varying the separating distance between the exposed surfaces 3a, 7a of the first and second permanent magnets 3, 7 by means of said control mechanism, the motor can be regulated between a stop or minimum power state, corresponding to the position of maximum distance D2 (FIG. 11), and a maximum power state, corresponding to the position of minimum distance D1 (FIGS. 9 and 10), including any intermediate state.

The aforementioned control mechanism comprises for each axial end of the central rotor 1 an adjustment wheel 19 assembled in the frame such that it can rotate a limited angle in both directions about the main shaft 2, independently of the rotation of the central rotor 1. This adjustment wheel 19 supports a number of first articulation pins 21 equal to the number of satellite rotors 5. The first articulation pins 21 are distributed at equal angular intervals around the periphery of the adjustment wheel 19 and are equidistant from the main shaft 2. For each axial end of each satellite rotor 5, the control mechanism comprises a pivoting arm 22 having a first end in which the secondary shaft 6 is rotationally supported and a second end connected such that it can pivot about the corresponding auxiliary shaft 13, independently of the rotation of the first gear wheel 11. The control mechanism is completed with a plurality of connecting rods 20, each of which has a first end pivotally connected to one of said first articulation pins 21 of said adjustment wheel 19 and a second end connected to the aforementioned first end of the corresponding pivoting arm 22 such that it can pivot about the secondary shaft 6 of the respective satellite rotor 5.

Thus, whereas the main shaft 2 of the central rotor 1 and the auxiliary shafts 13 have their positions fixed with respect to the frame, the secondary shaft 6 of each satellite rotor 5 is movably supported by one of the connecting rods 20 and one of the pivoting arms 22, and the constant length of said pivoting arm 22 ensures the correct meshing between the first and second gear wheels 11, 12 in any position. As shown in FIGS. 10 and 11, in this embodiment the adjustment wheel 19 is connected to a lever 10 which can be operated either manually or mechanically to rotate the adjustment wheel 19 the aforementioned limited angle in both directions about the main shaft 2. A rotation of the adjustment wheel 19 in either direction causes a movement in unison for moving all the satellite rotors 5 closer to or farther from the central rotor 1 (FIGS. 10 and 11), and thus it is possible to regulate the device between the stop or minimum power state and the maximum power state, including any intermediate state.

For greater clarity of the drawing, in FIG. 9 the adjustment wheel 19, the connecting rods 20 and the pivoting arms 22 are depicted by means of dashed lines, and, in FIGS. 10 and 11, the central rotor 1 and the adjustment wheel 19 are depicted partially and only one of the satellite rotors 5 with its corresponding connecting rod 20 and its pivoting arm 22 is shown. A person skilled in the art will conceive of alternative arrangements for the first control mechanism without departing from the scope of the present invention.

Figure 12:
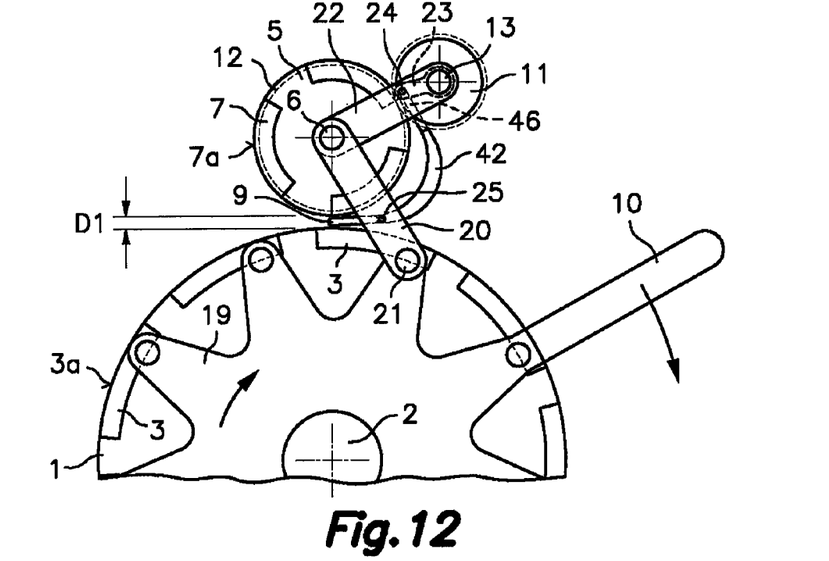
FIGS. 12 and 13 are partial front elevational views illustrating the simultaneous operation of first and second control mechanisms in a motor according to a variant of the complex embodiment shown in FIG. 9, where for greater clarity of the drawing some elements of the motor have been completely or partially omitted.
Figure 13:
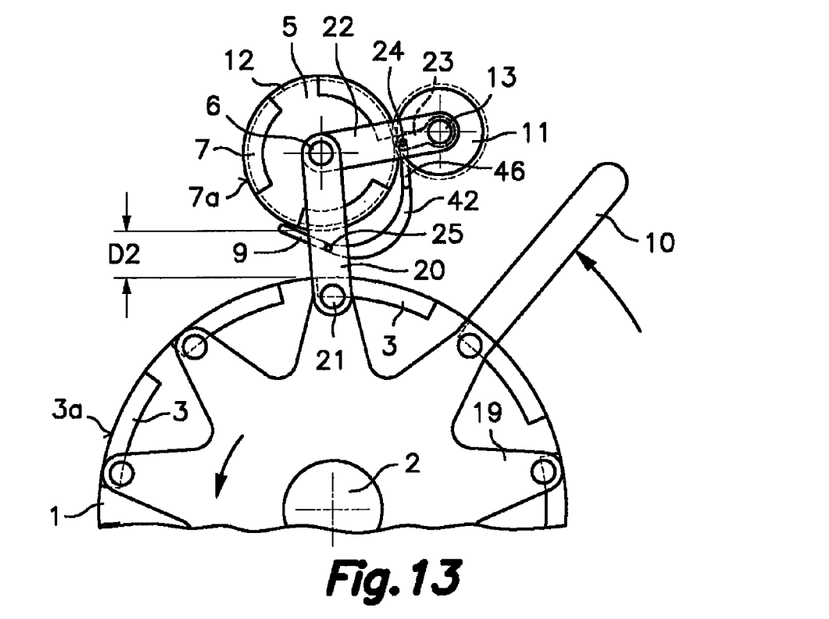

In relation to FIGS. 12 and 13, an embodiment variant of the motor 50 is described below which is entirely similar to the complex embodiment described above in relation to FIGS. 9 to 11 except that here, in addition to the first control mechanism useful in moving all the satellite rotors 5 in unison, all the magnetic screens 9 are movably assembled with respect to the frame and connected to a second operable control mechanism to move said magnetic screens 9 in unison between a position of minimum interference (FIG. 12) and a position of maximum interference (FIG. 13), including any intermediate position. In FIGS. 12 and 13, the first and second control mechanisms are arranged to be operated simultaneously and jointly for the purpose of matching the position of minimum distance D1 between the central rotor 1 and the satellite rotors 5 with the position of minimum interference of the magnetic screens 9 (FIG. 12), and the position of maximum distance D2 between the central rotor 1 and the satellite rotors 5 with the position of maximum interference of the magnetic screens 9 (FIG. 13), and thereby regulating the motor between a stop or minimum power state and a maximum power state, including any intermediate state.

In the embodiment variant of FIGS. 12 and 13, the second control mechanism comprises for each axial end of each satellite rotor 5 a pivoting element 23 having a first end connected such that it can pivot about the auxiliary shaft 13 and a second end pivotally connected to the corresponding support member 42 of the magnetic screen 9 by a second articulation pin 24. Furthermore, each magnetic screen 9 is pivotally connected to its corresponding connecting rod 20 by a third articulation pin 25 located between the aforementioned first articulation pin 21 and the auxiliary shaft 6. Thus, a rotation of the adjustment wheel 19 in either direction causes a movement in unison for moving all the satellite rotors 5 and all the magnetic screens 9 closer to or farther from the central rotor 1 (FIGS. 12 and 13), and it is thus possible to regulate the device between the stop or minimum power state and the maximum power state, including any intermediate state. A person skilled in the art will understand that for the correct operation of the second control mechanism, it is not necessary for the first end of the pivoting element 23 to be connected to pivot about the auxiliary shaft 13, being able to be connected to pivot about any other auxiliary shaft or articulation pin the position of which is fixed with respect to the frame, with an equivalent result. Likewise, though it is not essential, the support member 42 of each magnetic screen 9 has an auxiliary magnetic screen 46 similar to that described above in relation to FIG. 7 to mitigate any interaction between the magnetic fields of the second permanent magnets 7 of two adjacent satellite rotors 5. A person skilled in the art will conceive of alternative arrangements for the second control mechanism without departing from the scope of the present invention.

Figure 14:
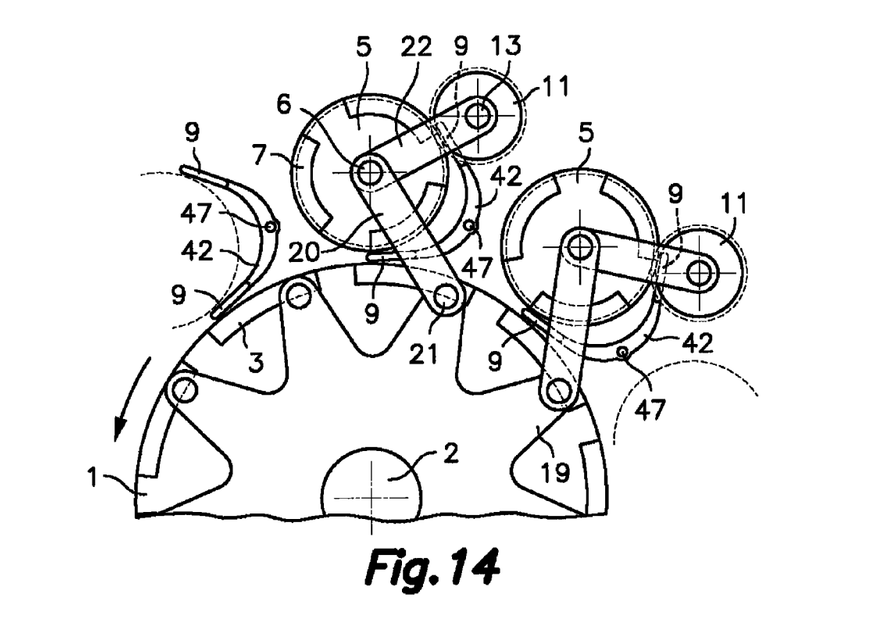
FIGS. 14 and 15 are partial front elevational views illustrating the simultaneous operation of first and second control mechanisms in a motor according to another variant of the complex embodiment shown in FIG. 9, where for greater clarity of the drawing some elements of the motor have been completely or partially omitted.
Figure 15:
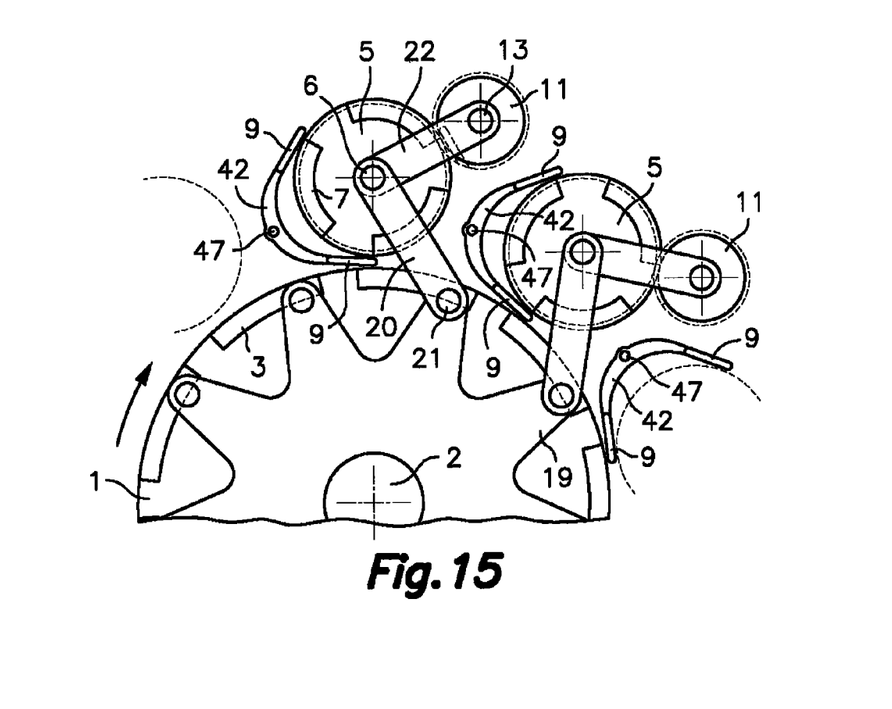

FIGS. 14 and 15 show yet another embodiment variant of the motor 50 which is entirely similar to the complex embodiment described above in relation to FIGS. 9 to 11 except that here, each support member 42 has two magnetic screens 9 arranged in a substantially symmetrical manner at opposite ends thereof, and each assembly formed by the support member 9 and the two magnetic screens 9 is arranged such that it can rotate about a shaft of rotation 47 parallel to the main shaft 2 and secondary shafts 6 between a first position, in which the magnetic screens 9 act in relation to a satellite rotor 5 located to the left of the support member 42 to cause the rotation of the main shaft 2 in the counterclockwise direction (FIG. 14), and a second position in which the magnetic screens 9 act in relation to a satellite rotor 5 located to the right of the support member 42 to cause the rotation of the main shaft 2 in the clockwise direction (FIG. 15). The assembly formed by the support member 42 and the magnetic screens 9 is connected to a reversing mechanism which can be actuated to move the assembly from the first position to the second position, and vice versa and thereby reverse the direction of rotation of the main shaft 2 of the motor 50. The shape and dimensions of the assembly formed by the support member 42 and the magnetic screens 9, as well as the position of the shaft of rotation 47, are selected to allow the rotation of the assembly when the satellite rotors 5 are in the position of maximum distance (not shown) due to the action of the first control mechanism.

Figure 16:
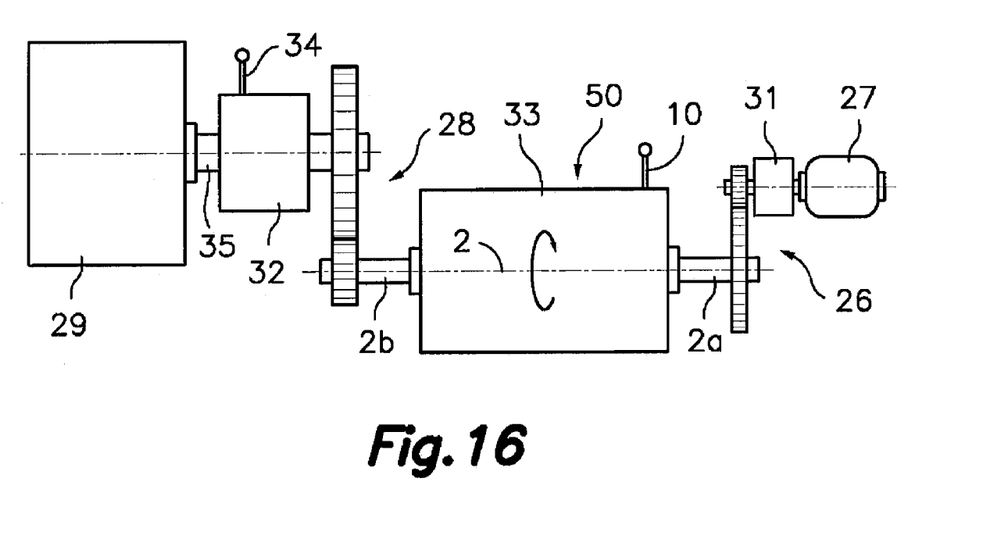
FIG. 16 is a schematic diagram illustrating an application example of the motor device of the present invention.

Now in reference to FIG. 16, a basic example of the application of the motor by selective interaction of magnetic fields of permanent magnets of the present invention is described below. In FIG. 16, reference numeral 50 generally designates the motor of the present invention, which is preferably housed in a casing 33, and the main shaft 2 of the motor 50 has two ends 2a, 2b projecting from said casing 33. One of the projecting ends 2a of the main shaft 2 is connected by means of a input mechanical movement transmission 26 to an auxiliary motor 27, which can be an electric motor, pneumatic motor, hydraulic motor, internal combustion engine or any other conventional type of motor capable of supplying power to the motor of the present invention during the startup thereof and/or in load periods in which the load exceeds a pre-established threshold, or when it is deemed appropriate. The aforementioned input mechanical movement transmission 26 can include, among other elements, a clutch 31. The other projecting end 2*b* of the main shaft 2 is connected by means of an output mechanical movement transmission 28 to the input shaft 35 of an apparatus 29 to be driven, such as, for example, an electric generator, a vehicle, a machine tool or any other type of apparatus, etc. The aforementioned output mechanical movement transmission 28 can also include, for example, a reducing mechanism, a clutch and/or a rotation inverter 32 that can be driven by means of a lever 34 for coupling and decoupling the input shaft 35 of the apparatus 29 and/or for selectively reversing the direction of rotation of the input shaft 35 of the apparatus 29 in relation to the direction of rotation of the main shaft 2 of the motor device 50.

It must be taken into account that a motor 30 according to the simple embodiment of the present invention shown in FIGS. 1 and 2, with a single first rotor 1 and a single second rotor 5, could incorporate a first control mechanism to vary the separating distance between the first and second rotors 1, 2 based on an adjustment lever, a connecting rod and a pivoting arm equivalent to the adjustment wheel 19, the connecting rods 20 and the pivoting arms of FIGS. 9 to 11. To that end, the secondary shaft 6 of the second rotor would be movably supported by the connecting rod and the pivoting arm. The kinematic link between the first and second rotors 1, 2 would be carried out by means of first and second gear wheels equivalent to the first and second gear wheels 11, 12 of FIGS. 9 to 11, and a pair of toothed wheels connected by a cog belt or chain equivalent to the second and third toothed wheels 16, 17 and second cog belts or chains 18 of FIG. 9. Optionally, the motor 30 could also include a second control mechanism to move the magnetic screen 9 in a manner equivalent to that described in relation to FIGS. 12 and 13.

A person skilled in the art will be able to make amendments and variations based on the embodiment shown and described without departing from the scope of the present invention as it is defined in the attached claims.

The invention claimed is:

1. A motor by selective interaction of magnetic fields of permanent magnets, comprising in combination:
    a first rotor arranged to rotate about a main shaft supported in a frame;
    a plurality of first permanent magnets fixed to said first rotor and spaced at equal angular intervals around its periphery, all the aforementioned first permanent magnets having the same pole on an outer side farthest from said main shaft;
    at least a second rotor arranged to rotate about a secondary shaft supported in said frame and parallel to the main shaft;
    a plurality of second permanent magnets fixed to said second rotor and spaced at equal angular intervals around its periphery, all the aforementioned second permanent magnets having the same pole on an outer side farthest from said secondary shaft and equal to the pole arranged in said outer side of the first permanent magnets of the first rotor;
    mechanical movement transmission means linking the first and second rotors to force them to rotate in opposite directions and at tangential speeds selected such that the first and second permanent magnets of the first and second rotors are arranged facing each other temporarily and consecutively during rotation;
    a magnetic screen arranged partially between the first and second rotors, said magnetic screen being formed by at least two superimposed permanent magnet plates with equal poles on their contacting faces and equal poles on their outer faces, the poles on their outer faces being equal to the poles on the outer sides of the first and second permanent magnets of the first and second rotors to interrupt or mitigate a magnetic interaction between the first and second permanent magnets in an upstream portion of their trajectories; and
    a conventional type auxiliary motor connected to the motor by selective interaction of magnetic fields such that said auxiliary motor can supply power to the motor by selective interaction of magnetic fields during a startup period and/or in load periods in which the load exceeds a pre-established threshold.

2. The motor according to claim 1, wherein the magnetic screen is located upstream of an imaginary plane joining the main shaft and the secondary shaft in relation to the directions of the trajectories of the first and second permanent magnets, and it has a leading edge in or close to said imaginary plane.

3. The motor according to claim 2, wherein the circumferential dimension of the first permanent magnets is greater than the circumferential dimension of the second permanent magnets, and they are arranged such that a leading edge of each first permanent magnet traverses the imaginary plane before a leading edge of a corresponding second permanent magnet, whereas trailing edges of the first and second permanent magnets traverse the imaginary plane substantially at the same time.

4. The motor according to claim 3, wherein each of the first permanent magnets of the first rotor has on the outer side an exposed surface in the form of a cylindrical part surface with all its points equidistant from the main shaft and each of the second permanent magnets of the second rotor has on the outer side an exposed surface in the form of a cylindrical part surface with all its points equidistant from the secondary shaft.

5. The motor according to claim 1, wherein said two permanent magnet plates of the magnetic screen are substantially the same size and have respective contiguous edges, the magnetic screen including a granulated permanent magnet bead arranged along said contiguous edges of the two permanent magnet plates.

6. The motor according to claim 5, wherein the two permanent magnet plates of the magnetic screen are held together against the magnetic force of repulsion by a band, which also envelops said granulated permanent magnet bead.

7. The motor according to claim 6, wherein the magnetic screen further includes a layer of granulated permanent magnet at least on the outer face of the permanent magnet plate arranged facing the first rotor, said band also enveloping said layer of granulated permanent magnet.

8. The motor according to claim 1, wherein the secondary shaft is movably supported with respect to said frame and connected to a first operable control mechanism to vary the distance between the secondary shaft and the main shaft, and thereby the distance between the outer sides of the second permanent magnets of the second rotor and the outer sides of the first permanent magnets of the first rotor when they are arranged facing each other, between a position of minimum distance and a position of maximum distance, including any intermediate position.

9. The motor according to claim 8, wherein the magnetic screen is movably assembled with respect to the frame and connected to a second operable control mechanism to move said magnetic screen between a position of minimum interference and a position of maximum interference between the first and second permanent magnets of the first and second rotors, including any intermediate position.

10. The motor according to claim 9, wherein said first and second control mechanisms are arranged to be operated simultaneously and/or jointly to match up said position of maximum distance with said position of maximum interference and said position of minimum distance with said position of minimum interference.

11. The motor according to claim 1, further comprising a plurality of said second rotors arranged at equal angular intervals around the first rotor such that the first rotor is a central rotor and the second rotors are satellite rotors, each of which is assembled to rotate about a corresponding secondary shaft parallel to the main shaft and equidistant therefrom, said mechanical movement transmission means being arranged linking the central rotor and the satellite rotors to force them to rotate in opposite directions and at tangential speeds selected such that the second permanent magnets of the satellite rotors are arranged facing the first permanent magnets of the central rotor temporarily and consecutively, and a plurality of said magnetic screens being arranged, each one associated with one of said satellite rotors.

12. The motor according to claim 11, wherein all the aforementioned secondary shafts are movably supported with respect to said frame and connected to a first operable control mechanism to vary in unison the distance between the secondary shafts and the main shaft between a position of minimum distance and a position of maximum distance, including any intermediate position.

13. The motor according to claim 12, wherein all the magnetic screens are movably assembled with respect to the frame and connected to a second operable control mechanism to move said magnetic screens in unison between a position of minimum interference and a position of maximum interference, including any intermediate position.

14. The motor according to claim 13, wherein the first and second control mechanisms are arranged to be operated simultaneously and/or jointly to match up the position of maximum distance with the position of maximum interference and the position of minimum distance with the position of minimum interference, and thereby regulate the motor between a stop or minimum power state and a maximum power state, including any intermediate state.

15. The motor according to claim 12, wherein the first control mechanism comprises for each axial end of the central rotor an adjustment wheel assembled in the frame to rotate a limited angle in both directions about the main shaft independently of the central rotor and supporting a plurality of first articulation pins distributed at equal angular intervals and equidistant from the main shaft, and for each axial end of each satellite rotor a pivoting arm with a first end rotationally supporting the secondary shaft and a second end connected to pivot about the corresponding auxiliary shaft, and a plurality of connecting rods, each with a first end pivotally connected to one of said first articulation pins of said adjustment wheel and a second end connected to the first end of one of said pivoting arms such that it can pivot about the secondary shaft of the respective satellite rotor.

16. The motor according to claim 15, wherein the second control mechanism comprises for each axial end of each satellite rotor a pivoting element with a first end connected to pivot about an auxiliary shaft the position of which is fixed with respect to the frame and a second end pivotally connected to the corresponding magnetic screen by a second articulation pin, each magnetic screen further being pivotally connected to its corresponding connecting rod by a third articulation pin located between the aforementioned first articulation pin and the auxiliary shaft.

17. The motor according to claim 16, wherein the adjustment wheel is connected to an operable lever to rotate the adjustment wheel said limited angle in both directions about the main shaft and thereby regulate the device between a stop or minimum power state and a maximum power state, including any intermediate state.

18. The motor according to claim 11, wherein the number of first permanent magnets in the central rotor is an odd number and the number of satellite rotors is equal to the number of first permanent magnets in the central rotor.

19. The motor according to claim 11, wherein the mechanical movement transmission means comprise for each satellite rotor a first gear wheel assembled in said frame to rotate about an auxiliary shaft and meshing with a second gear wheel arranged to rotate integrally with the satellite rotor about the secondary shaft, a first toothed wheel arranged to rotate integrally with said first gear wheel about said auxiliary shaft, and a first cog belt or chain meshing with all the aforementioned first toothed wheels to rotate all the satellite rotors in unison in the same direction, and at least a second cog belt or chain meshing with a second toothed wheel arranged to rotate integrally with the central rotor about said main shaft and with a third toothed wheel arranged to rotate integrally with one of the first gear wheels about the corresponding auxiliary shaft to rotate the satellite rotors and the central rotor in opposite directions.

20. The motor according to claim 1, wherein the main shaft is configured to be connected by means of a output mechanical movement transmission to an apparatus to be driven and by means of a input mechanical movement transmission to a conventional auxiliary motor capable of supplying power to the central rotor during a startup period and/or during load periods in which the load exceeds a pre-established threshold.

* * * * *

UNITED STATES PATENT AND TRADEMARK OFFICE
CERTIFICATE OF CORRECTION

PATENT NO.       : 8,704,419 B2
APPLICATION NO. : 13/122163
DATED            : April 22, 2014
INVENTOR(S)      : Jaume Motas Valls It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 513 days.

Signed and Sealed this

Twenty-ninth Day of September, 2015

Michelle K. Lee
*Director of the United States Patent and Trademark Office*